United States Patent Office 3,092,913
Patented June 11, 1963

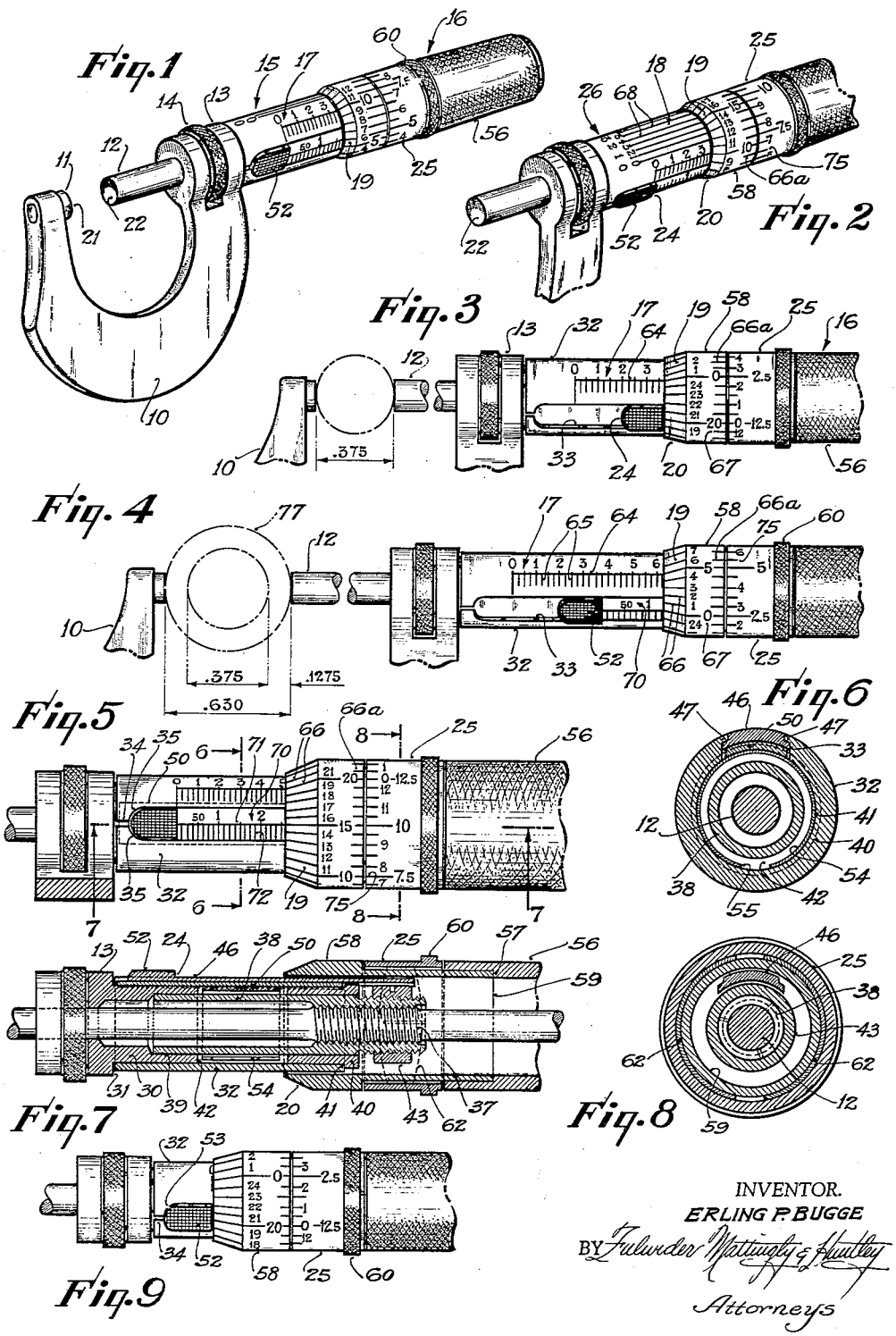

3,092,913
MICROMETER SCREW MEASURING
INSTRUMENT
Erling P. Bugge, P.O. Box 36183, Wilshire-La Brea
Branch, Los Angeles, Calif.
Filed Jan. 8, 1960, Ser. No. 1,205
8 Claims. (Cl. 33—166)

The present invention relates generally to measuring instruments and more particularly to instruments employing micrometer screws.

A great variety of micrometer screw measuring instruments have heretofore been devised to give a direct reading of a measured length. However it frequently occurs, and particularly in machine shop practice, that the measurement indicated by the instrument is significant only as a basis for mathematical calculation to determine another dimension that is immediately usable. For example, cylindrical surfaces are machined (on a lathe or other tool) by taking a series of cuts. After a cut has been made the then diameter of the workpiece is measured and calculations must then be made from this measurement in order to determine the radial distance for further advancing the cutting tool into the workpiece, i.e. a radial distance no greater than one-half the distance between the then diameter and the desired finished diameter. The necessity for such calculations also occurs in bench work in the process of locating centers. In this case, an over-all dimension of a workpiece is first measured and this measurement is then converted by calculation into another usable measurement indicative of a line along which a center is located.

In these and other instances the dimension directly readable on the measuring instrument is not directly usable for purposes of the operation in hand. Therefore, time must be consumed in making the necessary calculation and opportunity for error occurs during the process of making the calculation. It is an important object of my invention to provide measuring instruments of the micrometer screw type having an indexing means from which a directly usable measurement is readable without the necessity of going through any further calculations.

Another object of my invention is to provide a micrometer with adjustably mounted cooperating indices to give a direct reading of an immediately useful dimension that is proportional to the difference between desired and actual dimensions of a workpiece.

It is also an object of the invention to provide a micrometer with adjustably mounted cooperating indices that serve as a stop gauge limiting the span of the measuring faces of the micrometer to a desired dimension.

Yet another object of the invention is to provide a micrometer with a proportional index means cooperatively associated with conventional graduations of the micrometer to directly indicate a proportion of the dimension actually spanned by the measuring faces of the micrometer, or to directly indicate a proportion of the difference between desired and actual dimensions of a workpiece.

A still further object of the invention is to provide a micrometer having proportionate index means which include a proportionate vernier scale to indicate whole and fractional increments of units of one-ten thousandth of an inch.

These and other objects and advantages of the invention will be apparent from the following description of a presently preferred embodiment thereof, when taken in conjunction with the annexed drawing in which:

FIGURE 1 is a perspective view of a micrometer caliper embodying the invention;

FIGURE 2 is a partial perspective view of the micrometer shown in FIGURE 1, the illustrated portion of the micrometer being rotated slightly in a clockwise direction from its position shown in FIGURE 1 in order to illustrate the vernier scale thereof;

FIGURE 3 is a partial side elevational view of the micrometer illustrating the first steps in obtaining a direct reading of a proportionate part of the difference between desired and actual dimensions of a workpiece;

FIGURE 4 is a view similar to FIGURE 3, but illustrating subsequent steps in finding a proportion of a difference;

FIGURE 5 is a partial elevational view of the micrometer with the indexing means shown in position to indicate a proportion of the actual span between the measuring faces thereof, the micrometer being rotated slightly from its position shown in FIGURE 4;

FIGURE 6 is a transverse sectional view taken on the line 6—6 of FIGURE 5;

FIGURE 7 is a partial axial sectional view taken on the line 7—7 of FIGURE 5;

FIGURE 8 is a transverse sectional view taken on the line 8—8 of FIGURE 5; and

FIGURE 9 is a partial elevational view, similar to FIGURES 3 and 4, but showing the indexing means in positions assumed when the measuring faces of the micrometer are in contact with one another.

In the drawing, the invention has been illustrated as embodied in an outside micrometer caliper. However, it will be appreciated by those skilled in the art that the invention is not limited to this particular species of micrometer screw measuring instrument but may also be utilized in other classes of measuring devices. It will also be observed that while the illustrated caliper is calibrated according to the English system of measurement, the invention may also be embodied in measuring devices calibrated according to the metric system.

In general, the illustrated micrometer comprises a generally U-shaped frame 10 that at the end of one arm is fitted with an anvil 11. At the end of its other arm the frame 10 journals a spindle 12 through a cylindrical boss 13 and in coaxial alignment with the anvil 11. A conventional clamp ring 14 may be coaxially mounted in the boss 13 and is operatively associated with the spindle 12 in a conventional manner to keep the micrometer at a particular setting.

The micrometer also includes a barrel assembly, indicated generally by the numeral 15, and a thimble assembly, indicated generally by the numeral 16. The former has a conventional screw pitch scale 17 extending axially thereof as well as a circumferentially extending vernier scale 18, both of these scales being conventionally associated with a conventional thimble scale 19 marked on a beveled end 20 of the thimble assembly 16.

The general arrangement thus far described is entirely conventional, being illustrated in detail in Brown & Sharpe catalog No. 34, dated 1941. In the illustrated caliper, the confronting ends of the anvil 11 and spindle 12 constitute measuring faces 21 and 22, respectively, and have a range of one inch. The spindle 12 has a micrometer screw section with a pitch of 40 to the inch that is revolvable within a fixed nut held within the barrel assembly 15 to vary the opening between the measuring faces 21 and 22. The graduations on the pitch scale 17 correspond to the pitch of the screw, there being one graduation line for each revolution of the screw. The graduations of the thimble scale 19 subdivide each revolution of the micrometer screw into twenty-five equal increments. For any given setting of the micrometer, the scales 17, 18 and 19 are read in the usual manner.

According to my invention, the barrel assembly 15 includes an axially extending index means 24 that is adjustable axially of the barrel assembly. This index means has graduations spaced apart in increments equal to the spacing between the graduations of the pitch scale 17. When the index means 24 is positioned to extend through an axial range exactly coinciding with the axial range of the pitch scale 17, the micrometer concurrently gives direct readings of the span between the measuring faces 21 and 22 and of a proportion of the span, in this instance one-half of the true span. When the index means 24 is shifted axially of the barrel assembly 17, so as to be displaced relative to the pitch scale 17, it can be utilized in conjunction with other proportioning index means to give a direct reading of a proportion, in this instance one-half, of the difference between desired and actual dimensions of a workpiece.

My proportioning index means also includes an index thimble 25, journaled on the thimble assembly 16 immediately behind the thimble scale 19, and having graduations spaced equally with the graduations on the thimble scale. However, each increment on the index thimble 25 represents a fraction of an increment on the thimble scale 19 and the graduations on the index thimble are marked accordingly. This index thimble is adapted to be adjusted and read with respect to the index means 24 and also with respect to a second set of vernier markings 26, whereby to give the desired proportionate direct indication.

More specifically, the frame 10 has an integral hollow hub 30 that extends coaxially rearwardly from the boss 13. This hub has a smaller outer diameter than the outer diameter of the boss 13 to define a rearwardly facing shoulder 31.

The barrel assembly 15 includes a tubular barrel 32 formed with a slot 33 extending throughout the length of the barrel. At its forward end this slot is of greatly reduced width as indicated at 34. The opposite edges of the slot 33, intermediate the narrow portion 34 and the full width portion, define arcuate rearwardly facing shoulders 35. This barrel is sleeved over the hub 30, clamping itself in place like a spring clamp due to the presence of the slot 33.

The elongated spindle 12 has a micrometer screw section 37, the threads of which have the customary pitch of .025 inch for an English measure micrometer. In order to translate rotation of the spindle 12 into axial movement thereof, an elongated tubular fixed nut 38 is formed at its rear end with a tapped bore threadedly engaged by the spindle section 37. At its forward end the fixed nut 38 has a press fit within a counterbore 39 of the hub 30. Adjacent its rear end the elongated fixed nut 38 has a press fit within a bushing 40 which in turn has a press fit within the rear end of the barrel 32. The bushing 40 has a relatively short axial length and is formed with an exterior forwardly facing annular shoulder 41 in abutment with the extreme rear end of the barrel 32. An annular space 42 is thus defined between the confronting ends of the bushing 40 and the hub section 30, and between the interior surface of the barrel 32 and the exterior surface of the fixed nut 38. Rearwardly of the bushing 40 the fixed nut 38 is exteriorly tapped and mounts a slotted nut 43, comprising a conventional mechanism for making adjustments in the micrometer for the play of the threads of the micrometer screw.

The index means 24 comprises a narrow elongated band 46 axially slidably mounted in the barrel slot 33. Referring to FIGURE 6, it will be observed the band 46 and slot 33 have complementary substantially dovetail configurations, these two parts along their opposite longitudinal edges having circumferentially extending opposed shoulders providing abutments 47. The outermost face of the band 46 is convex and disposed within a common cylindrical surface with the exterior of the barrel 32.

In order to prevent the entrance of foreign material into the barrel assembly 15, irrespective of the axial position of the index means 24, a closure strip 50 lies beneath the index band 46. As is shown in FIGURE 6, this closure strip is arcuate in cross-sectional configuration and has a width adapting it for reception between the opposite side walls of the radially innermost portion of the slot 33. As is shown in FIGURE 7, the closure strip 50 is held against axial movement relative to the barrel assembly 15 at its forward end by hub shoulder 31, and at its rear end by the bushing shoulder 41.

At its forward end the index band 46 has an integral finger-engageable pad 52 of increased radial thickness whereby the pad protrudes above the surface of the barrel 32. The outer face of the pad 52 is knurled to provide a surface which can be securely engaged by a finger in order to shift the index band 46 axially of the barrel assembly. The pad 52 has a semicircular forward edge 53 that is matingly complementary to the shoulders 35 of the slot 33.

In the operation of the micrometer the index band 46 should be firmly, although yieldably, secured into any position to which it has been adjusted axially of the barrel assembly 15. To this end a somewhat tubular spring 54 is mounted within the annulus 42. As is shown in FIGURE 6, the spring 54 has a longitudinally extending slot 55, preferably disposed diametrically opposite to the slot 33 of the barrel 32. Spring 54 has a normal diameter substantially exceeding the internal diameter of the barrel 32 and is resiliently deformed to the condition shown in FIGURE 6 upon the assembly of the micrometer. The spring 54 thus exerts a radially outwardly directed force and bears against the inner concave face of the closure strip 50. The closure strip 50 in turn causes the index band 46 to be biased radially outwardly and held in the desired axial position and flush with the barrel 32 by its sliding abutment 47 with the barrel slot 33.

The thimble assembly 16 includes a knurled sleeve 56 that at its rear end is drivingly connected to the rear end of the spindle 12 in a conventional manner, as for example as shown in page 10 of the aforementioned Brown & Sharpe catalog. Referring now to FIGURE 7, it will be noted that the sleeve 56 at its forward end is formed with an internal annular shoulder 57. The thimble assembly 16 also includes a thimble piece 58 having a reduced diameter tail portion 59 receivable within the forward end of the knurled sleeve 56 in a press fit and in abutment with the shoulder 57.

The index thimble 25 is rotatably mounted on the reduced diameter tail portion 59 of the piece 58, with its outer surface flush with the outer surfaces of the enlarged diameter forward end portion of the thimble piece 58. This is shown in FIGURE 7 wherein it will also be noted that the index thimble 25 has an axial length such as to be slidable against the rearwardly facing shoulder defined at the junction of the forward and tail portions of the thimble piece 58, and also slidable against the forward end face of the knurled sleeve 56. In order to facilitate rotation of the index thimble 25 relative to the thimble piece 58, it is formed with a raised and knurled ring 60.

Like the index band 46, it is desirable that the index thimble 25 also be firmly, although yieldably, retained in an adjusted angular position relative to the thimble piece 58. For this purpose I have devised the arrangement best seen in FIGURES 7 and 8. It will be observed that the index thimble 25 has an interior diameter greater than the exterior diameter of the tail portion 59 of the thimble piece 58. In the annular space thus defined, a pair of oppositely disposed spring leaves 62 are arranged, which provide a nice degree of frictional drag for yieldably opposing displacement of the index thimble 25, while at the same time ensuring that the index thimble will retain an adjusted position. In order to avoid a tendency of the spring leaves 62 to bind at their midpoints, it is preferable that their opposite longitudinal edges be of elliptical configuration as shown in FIGURE 7.

The pitch scale 17 is conventional including a base line 64 marked on and extending axially of the barrel 32. Assuming a 1-inch micrometer calibrated according to the English system of measurement, the base line 64 is divided into forty spaces by a plurality of lines 65 extending circumferentially of the barrel 32 and intersecting the base line 64. Of course, the spacing between the lines 65 is .025 inch, corresponding to the pitch of the micrometer screw section 37 of the spindle 12. For ease of reading every fourth one of the lines 65 is marked with one of the integers from 0 to 9.

The thimble scale 19 is also conventionally marked, its beveled end 20 being divided by a plurality of axially extending lines 66 into twenty-five spaces. Each of the lines 66 is marked with one of the numerals from 0 to 24 inclusive, every fifth one of the numbers being marked in larger type 67, for convenience in reading.

The vernier scale 18 is also conventional, comprising a plurality of lines 68 extending axially of the barrel 32 and having a length at least as great as the 1-inch length of the pitch scale 17. Each one of the vernier lines 68 is also marked with its identifying digit, the digits running from 0 to 9 inclusive. It will be understood that this vernier scale has ten divisions, the line for the last one being marked with a digit 0, and these ten divisions equal the over-all space of nine divisions on the thimble scale 19.

The upper face of the index band 46 is also marked with a scale 70 extending axially of the barrel 32. This scale, like the pitch scale 17, has an over-all length of one inch, which length is divided into forty increments corresponding to the pitch of the micrometer screw 37. Thus the scale 70 has a base line 71 intersected by circumferentially disposed lines 72. However, each increment of space between the lines 72 has a value assigned to it corresponding to one-half the increment between the lines 65 of the pitch scale 17, and the scale 70 is calibrated accordingly. For example, referring to FIGURE 5, wherein the scale 70 occupies a position axially coextensive with the pitch scale 17, the numeral 1 on the scale 70 appears directly beneath the numeral 2 on the pitch scale 17.

Around the rear edge of its thimble portion the piece 58 is marked with a plurality of unnumbered lines 66a, each of which is axially aligned with one of the lines 66 of the thimble scale 19. The relatively rotatable index thimble 25 around its forward edge is marked with a like plurality of lines 75, alternate ones of which are marked with integers. The twenty-five spaces thus defined around the forward edge of the index thimble 25 have a total value (i.e., .0125 inch) equal to one-half the total value of the thimble scale 19 (i.e., .025 inch). For ease in reading the index thimble 25 the line 75 thereof which has been assigned the value of .0000 is also marked with the number 12.5. For the same purpose, every fifth one of the lines 75 is marked in larger type and of these, those having values .005, .0025 and .0075 have been numbered in large type as 5, 2.5 and 7.5 respectively. The vernier index 26 comprises the digits 0, 1, 2, 3, 4, 0 imprinted in counterclockwise order as seen in FIGURE 2, each of these digits being two spaces from its neighboring digits. Thus the two 0's appear immediately in front of the two 0's of the conventional vernier scale 18. The digits 1, 2, 3, 4 of the vernier index 26 appear immediately before the digits 2, 4, 6 and 8, respectively, of the vernier scale 18.

In use, suppose that it is desired to turn a piece 77 to a finished diameter of .375 inch. The micrometer is first adjusted until the span between its measuring faces 21 and 22 corresponds to this desired dimension, this being illustrated in FIGURE 3, and being readable in the usual manner from the pitch scale 17 and thimble scale 19. The circumferential spacing between the base line 64 of the pitch scale 17 and base line 71 of the scale 70 equals five of the spaces of the thimble scale 19 and, accordingly, the base line 71 is aligned with the line marked 20 on the thimble scale 19. The index thimble 25 is then rotated relative to the thimble scale 19 until its 0 line is also in alignment with the base line 71 of the scale 70. The rear edge of the finger pad 52 coincides with the 0 line of the scale 70 and this pad is next engaged with the finger and the index means 24 moved rearwardly along the barrel 32 until the rear edge of pad 52 engages the edge of the thimble piece 58.

The knurled sleeve 56 is now actuated to open the micrometer a sufficient distance to measure the starting diameter of the piece 77. During this opening of the micrometer, care is taken not to touch the index means 24 or index thimble 25 so as to avoid moving them out of their adjusted positions. The piece 77 is then measured and in the example given is found to have a diameter of .630 inch.

With my improved micrometer the user can now directly read the value of one-half the difference between the desired and starting dimensions of the piece 77. This value, of course, corresponds to the maximum permissible adjustment of a cutting tool radially of the piece 77. Thus, referring to the index means 24, it will be observed that the digit 1 is visible and two spaces beyond or to the right of the digit 1. The digit 1 has a value of .100. Each of the two spaces to the right of the digit has a value of .0125 and, referring to the index thimble 25, the number 2.5 is aligned with the base line 71 of the scale 70 thus giving a value of .0025. The total of these is .1275.

In the example illustrated there is no occasion to read the vernier scale 18 and vernier index 26 inasmuch as the assumed starting dimension of the piece 77 is .630 inch. However, let it be supposed that the starting diameter of a piece be .4697 inch and it is desired to turn the piece to .375 inch. Using the micrometer in the manner just described, one can directly read from the index means 24 and index thimble 25 the value of .047 inch. The seventh graduation on the vernier scale 18 would coincide with a line on the thimble scale 19 and would fall between the digits 3 and 4 of the vernier index 26. The seventh graduation line of the vernier scale 18 thus indicates a value of .00035 on the vernier index 26, which is added to the already directly read value of .047. Thus one-half of the difference between the starting size of .4697 inch and desired size of .375 inch can be directly read from my improved micrometer as .04735.

Returning now to the original example, let it be assumed that the piece 77 is mounted between centers in a lathe. The machinist then reduces the piece 77 to the desired size of .375 inch, probably by taking several cuts along the length of the workpiece. Between each cut or pass, the micrometer would again be applied to determine the then dimension of the workpiece before advancing the cutting tool radially inwardly another increment. It will be understood that the index means 24 and index thimble 25 have been retained in their adjusted positions whereby, upon each measurement, a direct reading of one-half the difference between the then dimension and desired dimension of the piece 77 can be directly read and the cutting tool adjusted accordingly. When the piece 77 has been reduced to the desired dimension the front edges of the thimble piece 58 will abut the rearwardly facing edge of the finger pad 52, the spring 54 exerting sufficient force to retain the index 24 in the desired adjusted position against the force of contact of the thimble piece 58.

In much the same fashion the micrometer can be utilized for directly reading one-half of a measured dimension, and this is illustrated in FIGURE 5. To accomplish this, the index means 24 is first moved axially along the barrel 32 until the finger pad 52 abuts the slot shoulders 35. In this position the 0 line on the pitch scale 17 coincides exactly with the rear end of the finger pad 52 and the pitch scale 17 and the scale 70 of the index means 24 are exactly axially coextensive.

In FIGURE 5 the reading of the micrometer pitch scale 17 and thimble scale 19 indicates a direct measurement of a piece having a dimension of .520 inch, the twentieth graduation line of the thimble scale 19 being in alignment with the base line 64 of the pitch scale 17. Referring to the index means 24, it will be observed that the digit 2 is observable as well as four spaces to the right of the digit. It will be recalled that each of these spaces on the scale 70 has a value of .0125 inch, making a total length visible on the scale 70 of .250 inch. Referring now to the index thimble 25, the number 10 is in alignment with the base line 71 of the scale 70, indicating the further addition of .010 inch making a total of .260 inch, or one-half of the directly measured dimension between the measuring faces 21 and 22. If the measured piece is now set on a surface plate a height gauge can be adjusted to an altitude of .260 inch in order to scribe a center line on the piece.

While I have disclosed but a single embodiment of my invention herein, it is to be understood that I do not mean to be limited to the specific details of construction hereinbefore illustrated and described but only by the spirit and scope of the following claims.

I claim:

1. In a micrometer screw measuring instrument having a barrel assembly, a spindle with a micrometer screw engagement with said barrel assembly, and a thimble assembly for actuating said spindle, the combination comprising: a fixed scale extending axially of said barrel assembly; a scale extending circumferentially of the front edge of said thimble assembly, said pair of scales having marked graduations for directly indicating a dimension actually measured with said instrument; an index band mounted on said barrel assembly for movement axially thereof and having a scale whose length equals the length of said fixed scale, said index-band scale including a base line extending axially of said barrel assembly and having graduations spaced along said base line whose pitch is equal to the pitch of the graduations of said fixed scale, the space between graduations of said index band having a value fractionally proportional to the pitch of the graduations of said fixed scale, at least some of said index-band graduations being marked in accordance with said value; and an index thimble rotatably mounted on said thimble assembly having graduations of the same pitch as the pitch of the graduations of said thimble assembly, at least some of said index-thimble graduations being marked in accordance with said value, said index thimble being rotatable independently of rotation of said thimble assembly to consecutively align the graduations of said index thimble with said base line, said graduations of said index band scale and of said index thimble giving a direct reading of a value fractionally proportional to a dimension indicated by said scale of said barrel assembly and said scale on the front edge of said thimble assembly.

2. In a micrometer screw measuring instrument having a barrel assembly, a spindle with a micrometer screw engagement with said barrel assembly, and a thimble assembly for actuating said spindle, the combination comprising: a fixed scale extending axially of said barrel assembly; a scale extending circumferentially of the front edge of said thimble assembly, said pair of scales having marked graduations for indicating a measurement taken with said instrument; an index band mounted on said barrel assembly for movement axially thereof and having a scale whose length equals the length of said fixed scale, said index-band scale including a base line extending axially of said barrel assembly and having graduations spaced along said base line whose pitch is equal to the pitch of the graduations of said fixed scale, the space between graduations of said index band having a value fractionally proportional to the pitch of the graduations of said fixed scale, at least some of said index-band graduations being marked in accordance with said value; and an index thimble rotatably mounted on said thimble assembly having graduations of the same pitch as the pitch of the graduations of said thimble assembly, at least some of said index-thimble graduations being marked in accordance with said value, said index thimble being rotatable concurrently with and independently of rotation of said thimble assembly to consecutively align the graduations of said index thimble with said base line, said index band having an abutment for engagement with the front edge of said thimble assembly, said abutment defining an end of the scale of said band.

3. In a micrometer screw measuring instrument having a barrel assembly, a spindle with a micrometer screw engagement with said barrel assembly, and a thimble assembly for actuating said spindle, the combination comprising: a pair of micrometer screw pitch scales extending axially of said barrel assembly, one of which is fixed and marked in accordance with the actual value of the pitch of said micrometer screw engagement and the other of which is on a member movable axially of said barrel assembly and marked in accordance with a fractional proportion of said actual value; a pair of thimble scales extending circumferentially of said thimble assembly, one of which thimble scales is fixed on said thimble assembly and marked in accordance with said actual value, and the other of which thimble scale is rotatable relative to said one thimble scale and marked in accordance with said fractional proportion of said actual value, said scales of said other pitch scale and of said other thimble scale giving a direct reading of a fractional proportion of a dimension actually measured by said instrument and indicated by said one pitch scale and said one thimble scale; and means to limit movement of said member towards said thimble assembly as a function of the position of said thimble assembly.

4. In a micrometer screw measuring instrument, the combination comprising: a frame; a barrel assembly on said frame including a fixed nut; a spindle extending through said frame and barrel assembly and having a micrometer screw engagement with said fixed nut; an index band extending axially of and axially movably mounted on said barrel assembly to be adjustable axially of said barrel assembly; a thimble assembly rotatably mounted on said barrel assembly and in driving engagement with said spindle and having a circumferentially extending scale graduated for cooperative association with a scale marked on said band; and a means on said band for limiting movement of said band in a direction towards said thimble assembly to a position wherein the forward end of said scale of said band is coincident with the forward end of said thimble assembly.

5. In a micrometer screw measuring instrument the combination comprising: a frame; a barrel assembly on said frame including a fixed nut; a spindle extending through said frame and barrel assembly and having a micrometer screw engagement with said fixed nut; an index band extending axially of and axially movably mounted on said barrel assembly; a means in said barrel assembly for yieldably securing said band in an axially adjusted position on said barrel assembly; a thimble assembly rotatably mounted on said barrel assembly and in driving engagement with said spindle; a tubular index thimble rotatably mounted on said thimble assembly and having a circumferentially extending scale graduated for cooperative association with a scale marked on said band; a means on said thimble assembly for yieldably securing said index thimble in an angularly adjusted position relative to said thimble assembly; and abutment means on said band for limiting movement of said band in a direction towards said thimble assembly whenever the forward end of the scale of said band is coincident with the forward end of said thimble assembly.

6. In a micrometer screw measuring instrument, the combination comprising: a frame; a barrel assembly on said frame including a tubular barrel and a fixed nut; a spindle extending through said frame and barrel assembly and having a micrometer screw engagement with said fixed nut; an index band mounted in an axially extending slot formed in said barrel for movement axially of said barrel, said band having an exterior face flush with the exterior surface of said barrel; a spring means within said barrel in contact with said band for yieldably securing said band in an axially adjusted position on said barrel; a thimble assembly rotatably mounted on said barrel assembly and in driving engagement with said spindle; a tubular index thimble rotatably mounted on said thimble assembly and having a circumferentially extending scale graduated for cooperative association with a scale marked on said band; a means on said thimble assembly for yieldably securing said index thimble in an angularly adjusted position relative to said thimble assembly; and a stop means on said barrel assembly for limiting movement of said band in a direction away from said thimble assembly.

7. In a micrometer screw measuring instrument, the combination comprising: a frame having a rearwardly extending hub; an elongated tubular fixed nut coaxially mounted within the rear end of said hub; a bushing mounted on the rear end of said nut and spaced axially rearwardly from said hub; a tubular barrel supported at opposite ends on said bushing and said hub and defining an annulus with said nut; an index band mounted in an axially extending slot formed in said barrel for movement axially of said barrel, said band and said barrel having axially extending abutting surfaces to limit radially outward displacement of said band to a flush relationship of the exterior face of said band and the exterior surface of said barrel; an axially extending closure strip within said slot beneath said band and held against axial movement by contact at opposite ends with confronting shoulders formed on said bushing and on said hub; a spindle extending through said frame and barrel and having a micrometer screw engagement with said fixed nut; a thimble assembly rotatably mounted on said barrel and in driving engagement with said spindle; a tubular index thimble rotatably mounted on said thimble assembly and having a circumferentially extending scale graduated for cooperative association with a scale marked on said band; a means in said thimble assembly for yieldably securing said index thimble in an angularly adjusted position relative to said thimble assembly; a pair of shoulders at the forward end of said slot for contact with the forward end of said band to limit movement of said band forwardly of said barrel; and a pad on the forward end of said band protruding outwardly of the exterior surface of said barrel and having a rearwardly facing edge for contact with a front edge of said thimble assembly to limit movement of said band rearwardly of said barrel.

8. In a micrometer screw measuring instrument, the combination comprising: a frame having a rearwardly extending hub; an elongated tubular fixed nut coaxially mounted within the rear end of said hub; a bushing mounted on the rear end of said nut and spaced axially rearwardly from said hub; a tubular barrel supported at opposite ends on said bushing and said hub and defining an annulus with said nut; an index band mounted in an axially extending slot formed in said barrel for movement axially of said barrel, said band and said barrel having axially extending abutting surfaces to limit radially outward displacement of said band to a flush relationship of the exterior face of said band and the exterior surface of said barrel; an axially extending closure strip within said slot beneath said band and held against axial movement by confronting shoulders formed on said bushing and on said hub; a tubular spring in said annulus that is biased radially outwardly into contact with said closure strip for yieldably securing said band in an axially adjusted position on said barrel; a spindle extending through said frame and barrel and having a micrometer screw engagement with said fixed nut; a thimble assembly rotatably mounted on said barrel and in driving engagement with said spindle; a tubular index thimble rotatably mounted in a circumferentially extending groove formed in said thimble assembly, said groove being spaced rearwardly from a front edge of said thimble assembly, said index thimble having substantially the same outer diameter as the front end portion of said thimble assembly; a pair of spring leaves within said index thimble and in said groove for yieldably securing said index thimble in an angularly adjusted position relative to said thimble assembly; a pair of shoulders at the forward end of said slot for contact with the forward end of said barrel to limit movement of said band in a direction forwardly of said barrel; and a pad on the forward end of said band protruding outwardly of the exterior surface of said barrel and having a rearwardly facing edge for contact with the front edge of said thimble assembly to limit movement of said band rearwardly of said barrel.

References Cited in the file of this patent

UNITED STATES PATENTS

| | | |
|---|---|---|
| 561,802 | Markham | June 9, 1896 |
| 1,391,016 | Slider et al. | Sept. 20, 1921 |
| 2,563,061 | Parker | Aug. 7, 1951 |
| 2,791,034 | Handy | May 7, 1957 |

FOREIGN PATENTS

| | | |
|---|---|---|
| 8,750 | Great Britain | Apr. 14, 1913 |
| 174,275 | Great Britain | Jan. 26, 1922 |